US011977986B2

(12) United States Patent
Zhang et al.

(10) Patent No.: US 11,977,986 B2
(45) Date of Patent: May 7, 2024

(54) DYNAMIC COMPUTATION RATES FOR DISTRIBUTED DEEP LEARNING

(71) Applicant: International Business Machines Corporation, Armonk, NY (US)

(72) Inventors: Wei Zhang, Elmsford, NY (US); Xiaodong Cui, Chappaqua, NY (US); Abdullah Kayi, Westchester, NY (US); Alper Buyuktosunoglu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 819 days.

(21) Appl. No.: 16/925,161

(22) Filed: Jul. 9, 2020

(65) Prior Publication Data

US 2022/0012629 A1    Jan. 13, 2022

(51) Int. Cl.
*G06N 3/098* (2023.01)
*G06N 3/045* (2023.01)
(Continued)

(52) U.S. Cl.
CPC ............. *G06N 3/098* (2023.01); *G06N 3/045* (2023.01); *G06N 3/08* (2013.01); *G06N 5/043* (2013.01); *G06N 20/00* (2019.01); *G06N 20/20* (2019.01); *G05B 2219/33151* (2013.01); *G06F 18/214* (2023.01)

(58) Field of Classification Search
CPC .......... G06N 3/098; G06N 3/08; G06N 20/00; G06N 20/20; G06N 5/043; G06N 3/045; G05B 2219/33151; G06F 18/214
See application file for complete search history.

(56) References Cited

U.S. PATENT DOCUMENTS 8,695,009 B2   4/2014   Vojnovic
9,939,792 B2   4/2018   Chen et al.
(Continued)

FOREIGN PATENT DOCUMENTS

CN   104598972 A   5/2015
CN   109492753 A   3/2019
(Continued)

OTHER PUBLICATIONS

Yang et al., "BOA: batch orchestration algorithm for straggler mitigation of distributed DL training in heterogeneous GPU cluster" Apr. 16, 2019, pp. 47-67. (Year: 2019).*
(Continued)

*Primary Examiner* — Shane D Woolwine
*Assistant Examiner* — Chase P. Hinckley
(74) *Attorney, Agent, or Firm* — Stosch Sabo (57) ABSTRACT

Embodiments of a method are disclosed. The method includes performing distributed deep learning training on multiple batches of training data using corresponding learners. Additionally, the method includes determining training times wherein the learners perform the distributed deep learning training on the batches of training data. The method also includes modifying a processing aspect of the straggler to reduce a future training time of the straggler for performing the distributed deep learning training on a new batch of training data in response to identifying a straggler of the learners by a centralized control.

19 Claims, 4 Drawing Sheets

(51) Int. Cl.
  *G06N 3/08*  (2023.01)
  *G06N 5/043*  (2023.01)
  *G06N 20/00*  (2019.01)
  *G06N 20/20*  (2019.01)
  *G06F 18/214*  (2023.01)

(56) References Cited

U.S. PATENT DOCUMENTS

| | | | |
|---|---|---|---|
| 10,963,300 | B2* | 3/2021 | Champigny .......... G06F 9/4881 |
| 11,243,814 | B2* | 2/2022 | Shen ................... G06F 11/3017 |
| 11,461,213 | B2* | 10/2022 | Agrawal ............. G06F 11/3433 |
| 11,875,256 | B2* | 1/2024 | Zhang ................... G06N 3/063 |
| 2011/0247003 | A1 | 10/2011 | Fong et al. |
| 2016/0103901 | A1 | 4/2016 | Kadav |
| 2017/0091668 | A1 | 3/2017 | Kadav et al. |
| 2018/0129969 | A1 | 5/2018 | Feng et al. |
| 2018/0253646 | A1 | 9/2018 | Feng et al. |
| 2018/0293463 | A1 | 10/2018 | Brown |
| 2018/0300171 | A1* | 10/2018 | Qiao ..................... G06F 9/5088 |
| 2019/0042934 | A1 | 2/2019 | Arunachalam et al. |
| 2019/0155620 | A1 | 5/2019 | Arunachalam |
| 2019/0171935 | A1 | 6/2019 | Agrawal et al. |
| 2020/0042362 | A1 | 2/2020 | Cui et al. |
| 2020/0104127 | A1* | 4/2020 | Grover ..................... G06N 3/04 |
| 2020/0184320 | A1 | 6/2020 | Croxford |
| 2020/0387777 | A1* | 12/2020 | Avestimehr ............ G06N 20/20 |
| 2021/0034374 | A1 | 2/2021 | Saxena |
| 2021/0133555 | A1* | 5/2021 | Qiu ........................ G06N 3/082 |
| 2021/0176174 | A1* | 6/2021 | Chou .................. H04L 67/1008 |
| 2021/0194831 | A1* | 6/2021 | Huang ................... H04L 69/22 |
| 2022/0004933 | A1* | 1/2022 | Gu ....................... G06F 16/9027 |
| 2022/0012584 | A1* | 1/2022 | Zhang ................... G06N 3/063 |
| 2022/0012629 | A1 | 1/2022 | Zhang |
| 2022/0012642 | A1* | 1/2022 | Zhang ................... G06N 20/20 |
| 2023/0012487 | A1* | 1/2023 | Makaya ................ G06F 9/5027 |
| 2023/0068386 | A1* | 3/2023 | Akdeniz ................ G06N 3/063 |
| 2023/0145437 | A1* | 5/2023 | Costa .................... G06F 9/4887 |
| | | | 718/107 |

FOREIGN PATENT DOCUMENTS

| | | |
|---|---|---|
| CN | 110659745 A | 1/2020 |
| WO | 2019183195 A1 | 9/2019 |

OTHER PUBLICATIONS

Ozfatura et al., "Age-Based Coded Computation for Bias Reduction in Distributed Learning" Jun. 2, 2020, arXiv: 2006.01816v1, pp. 1-6. (Year: 2020).*

Geng et al., "ElasticPipe: An Efficient and Dynamic Model-Parallel Solution to DNN Training" Jun. 25, 2019, pp. 5-9. (Year: 2019).*

Zhou et al., "Falcon: Towards Computation-Parallel Deep Learning in Heterogeneous Parameter Server" 2019, pp. 196-206. (Year: 2019).*

Dutta et al., "Slow and Stale Gradients Can Win the Race: Error-Runtime Trade-offs in Distributed SGD" 2018, pp. 1-10. (Year: 2018).*

Yu et al., "Layered SGD: A Decentralized and Synchronous SGD Algorithm for Scalable Deep Neural Network Training" Jun. 13, 2019, arXiv: 1906.05936v1, pp. 1-7. (Year: 2019).*

Hoi et al., "Online Feature Selection for Mining Big Data" Aug. 12, 2012, pp. 93-100. (Year: 2012).*

Ferdinand et al., "Anytime Minibatch: Exploiting Stragglers in Online Distributed Optimization" Jun. 10, 2020, arXiv: 2006.05752v1, pp. 1-26. (Year: 2020).*

Bitar et al., "Stochastic Gradient Coding for Straggler Mitigation in Distributed Learning" May 14, 2019, arXiv: 1905.05383v1, pp. 1-23. (Year: 2019).*

Yu et al., "Entangled Polynomial Codes for Secure, Private, and Batch Distributed Matrix Multiplication: Breaking the 'Cubic' Barrier" Apr. 13, 2020, arXiv: 2001.05101v2, pp. 1-14. (Year: 2020).*

Behrouzi-Far et Soljanin, "Efficient Replication for Straggler Mitigation in Distributed Computing" Jun. 3, 2020, arXiv: 2006.02318v1, pp. 1-19. (Year: 2020).*

Zhang et Simeone, "LAGC: Lazily Aggregated Gradient Coding for Straggler-Tolerant and Communication-Efficient Distributed Learning" Apr. 8, 2020, arXiv: 1905.09148v2, pp. 1-24. (Year: 2020).*

Amiri et al., "Computation Scheduling for Distributed Machine Learning with Straggling Workers" May 23, 2019, arXiv: 1810.09992v3, pp. 1-13. (Year: 2019).*

Mallick et al., "Rateless Codes for Near-Perfect Load Balancing in Distributed Matrix-Vector Multiplication" Oct. 30, 2019, arXiv: 1804.10331v5, pp. 1-40. (Year: 2019).*

Geng et al., "Fela: Incorporating Flexible Parallelism and Elastic Tuning to Accelerate Large-Scale DML" May 27, 2020, pp. 1393-1404. (Year: 2020).*

Narra et al., "Slack Squeeze Coded Computing for Adaptive Straggler Mitigation" Nov. 2019, pp. 1-16. (Year: 2019).*

Mo et Xu, "Energy-Efficient Federated Edge Learning with Joint Communication and Computation Design" Feb. 29, 2020, arXiv: 2003.00199v1, pp. 1-28. (Year: 2020).*

Cai et al., "D2D-Enabled Data Sharing for Distributed Machine Learning at Wireless Network Edge" Jan. 28, 2020, arXiv: 2001.11342v1, pp. 1-5. (Year: 2020).*

Hanna et al., "Adaptive Distributed Stochastic Gradient Descent for Minimizing Delay in the Presence of Stragglers" Feb. 25, 2020, arXiv: 2002.11005v1, pp. 1-5. (Year: 2020).*

Jiang et al., "Heterogeneity-aware Distributed Parameter Servers" May 2017, pp. 1-16. (Year: 2017).*

Ilager et al., "A Data-Driven Frequency Scaling Approach for Deadline-aware Energy Efficient Scheduling on Graphics Processing Units (GPUs)" Apr. 28, 2020, arXiv: 2004.08177v2, pp. 1-10. (Year: 2020).*

Koliousis et al., "Crossbow: Scaling Deep Learning with Small Batch Sizes on Multi-GPU Servers" Jan. 8, 2019, arXiv: 1901.02244v1, pp. 1-14. (Year: 2019).*

Zheng et al., "Cynthia: Cost-Efficient Cloud Resource Provisioning for Predictable Distributed Deep Neural Network Training" Aug. 2019, pp. 1-11. (Year: 2019).*

Saxena et al., "Effective Elastic Scaling of Deep Learning Workloads" Jun. 24, 2020, arXiv: 2006.13878v1, pp. 1-15. (Year: 2020).*

Wang et al., "Communication Contention Aware Scheduling of Multiple Deep Learning Training Jobs" Feb. 24, 2020, arXiv: 2002.10105v1, pp. 1-12. (Year: 2020).*

Chaudhary et al., "Balancing Efficiency and Fairness in Heterogeneous GPU Clusters for Deep Learning" Apr. 2020, pp. 1-16. (Year: 2020).*

Guo et al., "Efficient Gradient Descent via Value Staleness Analysis for Heterogeneous Deep Learning Systems" 2019, pp. 31-36. (Year: 2019).*

Elgabli et al., "GADMM: Fast and Communication Efficient Framework for Distributed Machine Learning" Mar. 24, 2020, arXiv: 1909.00047v3, pp. 1-40. (Year: 2020).*

Kadhe et al., "Communication-Efficient Gradient Coding for Straggler Mitigation in Distributed Learning" May 14, 2020, arXiv: 2005.07184v1, pp. 1-7. (Year: 2020).*

Trimananda et al., "PingPong: Packet-Level Signatures for Smart Home Device Events" Feb. 10, 2020, arXiv: 1907.11797v3, pp. 1-24. (Year: 2020).*

Ozfatura et al., "Straggler-aware Distributed Learning: Communication Computation Latency Trade-off" Apr. 10, 2020, arXiv: 2004.04948v1, pp. 1-22. (Year: 2020).*

Wang et al., "Adaptive Communication Strategies to Achieve the Best Error-runtime Trade-off in Local-update SGD" 2019. (Year: 2019).*

Chen et al., "Fast Distributed Deep Learning via Worker-adaptive Batch Sizing", SoCC '18, Oct. 11-13, 2018, 1 page.

Jiang et al., "Heterogeneity-aware Distributed Parameter Servers", SIGMOD'17, May 14-19, 2017, pp. 463-478.

Chen et al., "Revisiting distributed synchronous SGD", Mar. 21, 2017, pp. 1-10.

Yao et al., "FluentPS: A Parameter Server Design with Low-frequency Synchronization for Distributed Deep Learning", Conference Paper • Sep. 2019, 12 pages.

(56) References Cited

OTHER PUBLICATIONS

Yang et al., "An adaptive batch-orchestration algorithm for the heterogeneous GPU cluster environment in distributed deep learning system", 2018 IEEE International Conference on Big Data and Smart Computing, pp. 725-728.

Basu et al., "Balancing stragglers against staleness in distributed deep learning", 2018 IEEE 25th International Conference on High Performance Computing (HiPC), pp. 12-21.

Jayarajan, A., "Priority-based parameter propagation for distributed deep neural network training", Aug. 2019, 50 bages.

Luo et al., "Parameter Hub: A Rack-Scale Parameter Server for Distributed Deep Neural Network Training", May 21, 2018, 15 pages.

Yu et al., "GradiVeQ: Vector Quantization for Bandwidth-Efficient Gradient Aggregation in Distributed CNN Training", 32nd Conference on Neural Information Processing Systems, Dec. 31, 2018, 12 pages.

Lin et al., "Deep Gradient Compression: Reducing the Communication Bandwidth for Distributed Training", Feb. 16, 2018, 14 pages.

Chen et al., "AdaComp: Adaptive Residual Gradient Compression for Data-Parallel Distributed Training", The Thirty-Second AAAI Conference on Artificial Intelligence (AAAI-18), 2018, pp. 2827-2835.

Zhang et al., "Dynamic Computation in Decentralized Distributed Deep Learning Training", U.S. Appl. No. 16/925,178, filed Jul. 9, 2020.

Zhang et al., "Dynamic Network Bandwidth in Distributed Deep Learning Training", U.S. Appl. No. 16/925,192, filed Jul. 9, 2020.

IBM, List of IBM Patents or Patent Applications Treated as Related, Jun. 17, 2020, 2 pages.

Harlap, Aaron, et al. "Addressing the straggler problem for iterative convergent parallel ML." Proceedings of the seventh ACM symposium on cloud computing. 2016. (Year: 2016).

Lian, Xiangru, et al. "Can Decentralized Algorithms Outperform Centralized Algorithms? A Case Study for Decentralized Parallel Stochastic Gradient Descent." arXiv preprint arXiv:1705.09056 (2017). (Year: 2017).

U.S. Appl. No. 16/925,178 Notice of References Cited, mailed Aug. 30, 2023, 1 pg.

U.S. Appl. No. 16/925,192,—Notice of Reference Cited, mailed Nov. 22, 2022.

\* cited by examiner

DYNAMIC COMPUTATION RATES FOR DISTRIBUTED DEEP LEARNING

BACKGROUND

The present disclosure relates to distributed deep learning, and more specifically, to dynamic computation rates for distributed deep learning.

Deep learning training is a technological field that represents a subset of machine learning. Machine learning involves teaching a computer algorithm, i.e., the machine, to label a data record in some way, e.g., labelling the subject of a photograph as animate or inanimate. Machine learning involves training the computer algorithm to make the classification by providing labeled examples, e.g., picture subjects labeled as animate or not. In machine learning training, a classification task is performed repeatedly in order to gradually improve the accuracy of the classification. Deep learning training involves making these same classifications but can use neural networks, which mimic learning in the human brain. Such learning is possible due to multiple layers of computational logic that enable progressive learning, i.e., enable the machine to get better at the classification.

SUMMARY

Embodiments of a method are disclosed. The method includes performing distributed deep learning training on multiple batches of training data using corresponding learners. Additionally, the method includes determining training times wherein the learners perform the distributed deep learning training on the batches of training data. The method also includes modifying a processing aspect of a straggler to reduce a future training time of the straggler for performing the distributed deep learning training on a new batch of training data in response to identifying the straggler of the learners by a centralized control.

Further aspects of the present disclosure are directed toward systems and computer program products with functionality similar to the functionality discussed above regarding the computer-implemented methods. The present summary is not intended to illustrate each aspect of every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Machine learning is a process wherein a computer algorithm is trained to make a specific classification. For example, machine learning algorithms (learners) can be trained to identify classes of objects in a digital photograph, predict a future shopping choice of a potential customer in a marketing database, and so on. However, training learners can be computationally expensive. In other words, training can involve relatively large numbers of computational decision-making. As such, training can take a relatively large amount of time, which may violate constraints on the relevance of the trained classification. For example, a future sale may be scheduled for a holiday weekend. Accordingly, training a machine learning algorithm to predict future shopping choices may not be relevant once the holiday weekend has passed. Thus, using distributed deep learning, it is possible to reduce the amount of time involved in training.

Distributed deep learning training reduces the amount of time involved in training by training a number of learners, in parallel, to perform different parts of the classification problem. Distributed deep learning training can involve either a central or decentralized control. The control can distribute training data to the learners, determine and adjust training parameters, coordinate the processing of training data, and the like. These controls can be synchronous or asynchronous. Synchronous control means that the training of the multiple learners is concurrent, or processed within an overlapping time period. Asynchronous control means that the training time periods may not overlap.

Because overlapping time periods can improve the efficiency of distributed deep learning, a centralized synchronous distributed deep learning training approach can be useful for finding solutions to classifications and convergence in machine learning. However, this approach may not be time efficient because of the straggler problem. The straggler problem refers to scenarios where slow learners can use a disproportionate amount of the overall clock time of the training, according to Amdahl's Law. In this way, the centralized control can represent a single point of failure because the centralized control may wait until all learners have finished before performing the centralized processing. Additionally, synchronous collective communication can result in hot spots and accordingly performance degradation due to bandwidth issues between the learners and the central control.

Accordingly, some embodiments of the present disclosure can dynamically adjust the rate of computation for distributed deep learning training. Dynamically adjusting the rate of computation can balance the amount of time that stragglers use with the amount of time that the rest of the learners use to perform their training. In this way, some embodiments of the present disclose can improve the run-time performance, and reduce the power consumption, of distributed deep learning training.

Figure 1:
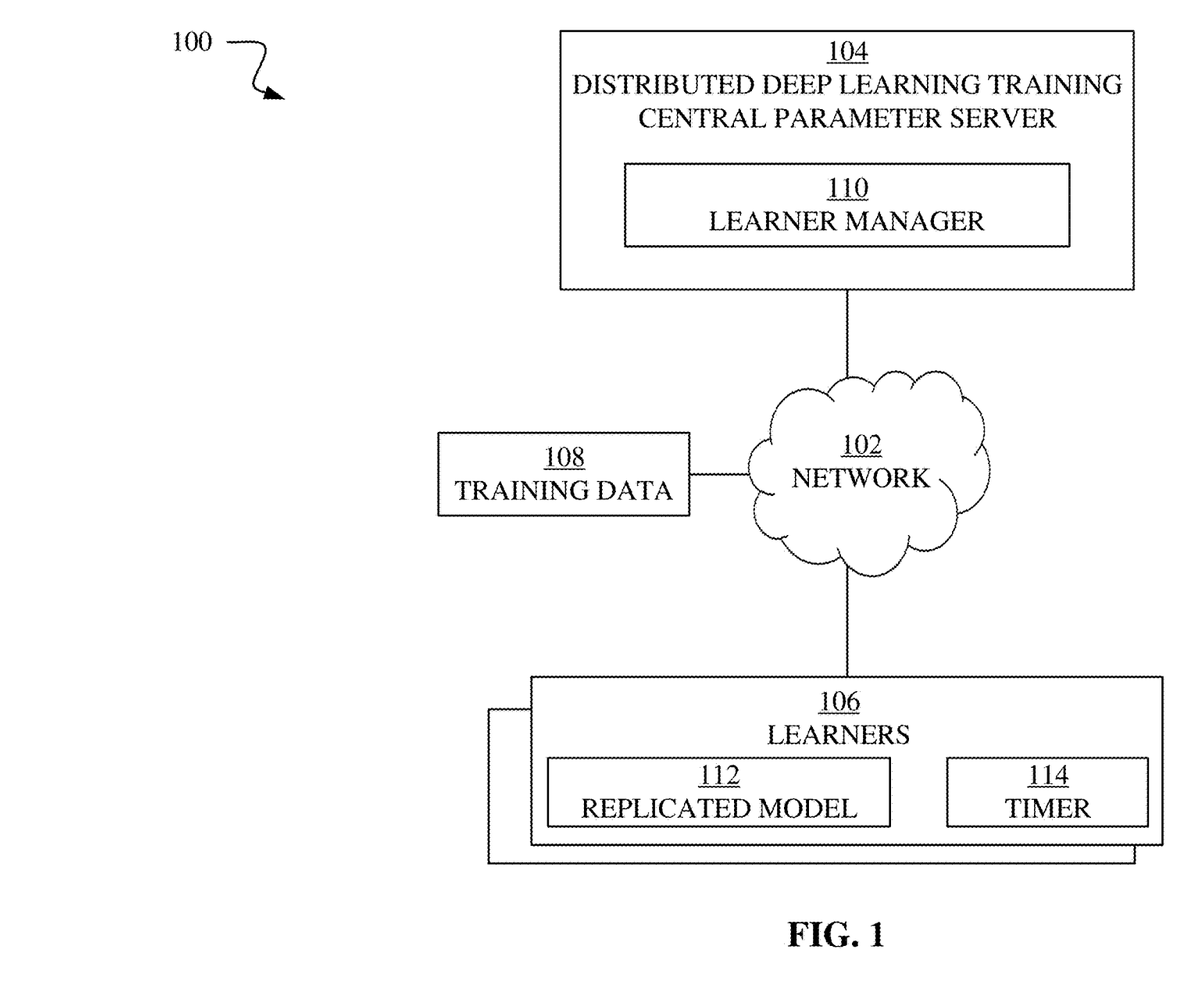
FIG. 1 is a block diagram of an example system for determining dynamic computation rates for distributed deep learning, in accordance with some embodiments of the present disclosure.

FIG. 1 is a block diagram of an example system 100 for determining dynamic computation rates for distributed deep learning, in accordance with some embodiments of the present disclosure. The system 100 includes a network 102, distributed deep learning training central parameter server 104, learners 106, and training data 108.

The distributed deep learning training central parameter server 104 can perform distributed deep learning training by coordinating the processing of multiple batches of training data 108 to train learners 106 in parallel. The training data 108 can be multiple records that the learners 106 classify. Additionally, the training data 108 can include labels that indicate the correct classifications. In this way, the learners 106 can determine when their classifications are correct. Accordingly, the learners can adjust specific parameters used to make the classifications based on whether classifications are correct. These parameters are also referred to herein as weights and gradients.

More specifically, the distributed deep learning training central parameter server 104 can distribute the training data 108 to the learners 106, along with a centrally determined weight for the learner 106. Once the learners 106 adjust the gradients based on the correctness of their classifications, the distributed deep learning training central parameter server 104 can centrally process the individual gradients to determine a new weight for the next batch of training data.

Additionally, the distributed deep learning training central parameter server 104 can include a learner manager 110. The learner manager 110 can identify stragglers in the learners 106 based on the amount of time the learners 106 take to process each batch of training data 108.

The learners 106 can include a replicated model 112 and a timer 114. The replicated model 112 can be a machine learning model that the learner 106 uses to make the classification. The replicated model 112 can be replicated across each of the learners 106. The timer 114 can track the amount of training time for the learner 106 to process each batch of training data 108.

In some embodiments, the learner manager 110 can additionally base the determination on whether the training time of each of the learners 106 exceeds a predetermined threshold. Additionally, the learner manager 110 can identify learners 106 that exceed the predetermined threshold as stragglers. In some embodiments, stragglers may also be repeat offenders. In other words, the learner manager 110 may identify stragglers as learners 106 that exceed the predetermined threshold for multiple batches of training data 108. Accordingly, the distributed deep learning training central parameter server 104 may reduce the amount of training data 108 for the stragglers. Further, the distributed deep learning training central parameter server 104 can distribute the excess, e.g., the reduced number of training data 108 records to the remaining learners 106. In this way, the straggler can reduce the amount of time performing the training by reducing the number of training data 108 records processed.

In some embodiments, the learner manager 110 can adjust the frequency rate of a computational processor of the straggler. By increasing the frequency rate, the learner manager 110 can reduce the amount of time that the straggler takes to process the training data 108 without reducing the number of training data 108 records. In some embodiments, the learner manager 110 can perform some combination of reducing training data 108 records and increasing the frequency rate of the straggler. In some embodiments, the learner manager 110 can reduce the frequency rate of all learners 106 but the straggler. In this way, the learner manager 110 balances the amount of training time by increasing the training time for the learners 106 that are not straggling.

Figure 2:
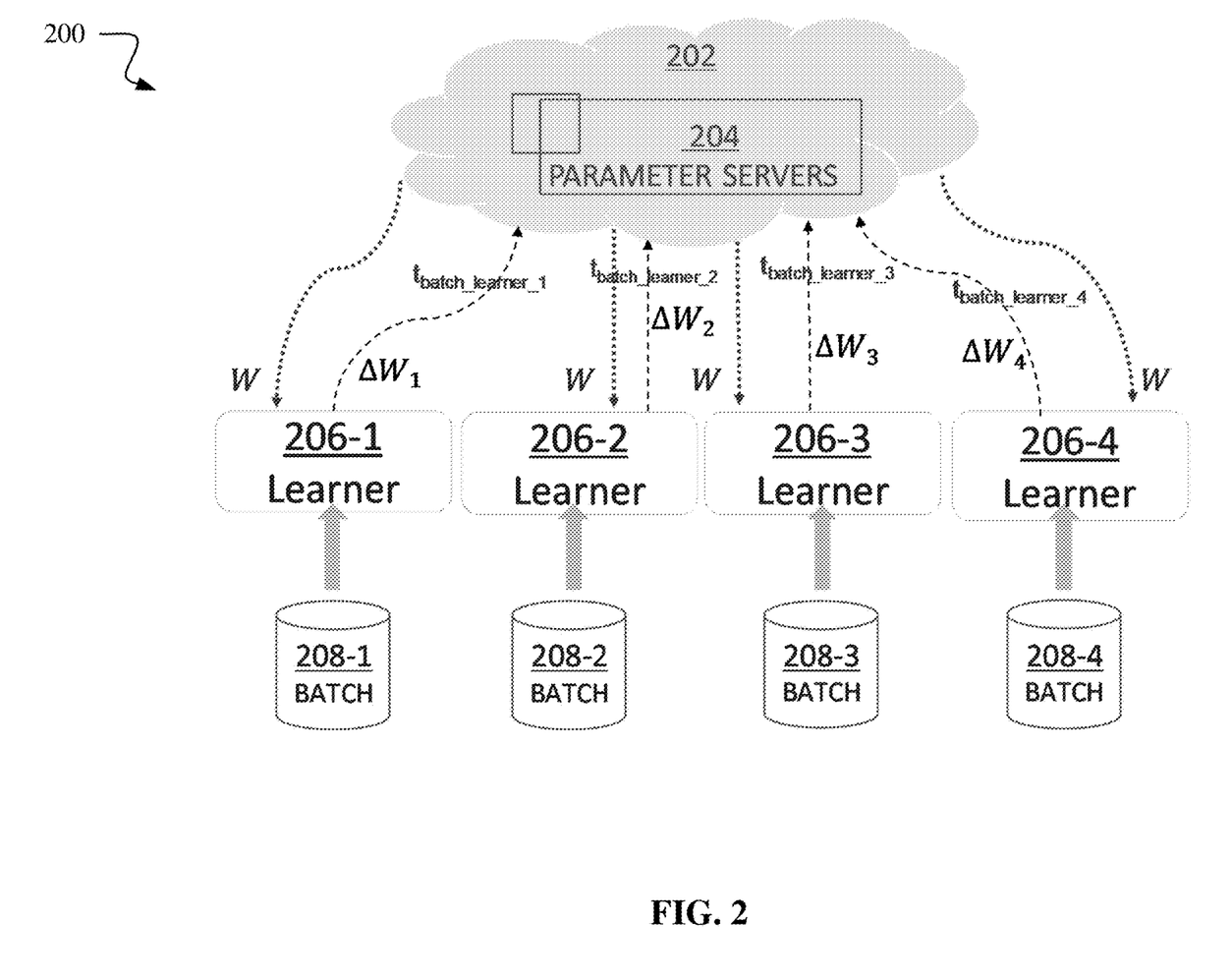
FIG. 2 is an example system for determining dynamic computation rates for distributed deep learning, in accordance with some embodiments of the present disclosure.

FIG. 2 is an example system 200 for determining dynamic computation rates for distributed deep learning, in accordance with some embodiments of the present disclosure. The system 200 includes a network 202, central parameter servers 204, learners 206, and training data batches 208. The network 202 can be similar to the network 102, described with respect to FIG. 1. Similarly, the centralized parameter server 204 can be similar to the distributed deep learning training central parameter server 104. Additionally, the learners 206 can be similar to the learners 106, and the training data batches 208 can be similar to the training data 108.

In some embodiments, the learners 206 can pull the weight W from central parameter servers 204 and compute the gradient ΔW using the batch size. The batch size can refer to the amount of training data in the training data batches 208. Additionally, the learners 206 can push the gradient back to the centralized parameter servers 204.

The centralized parameter servers 204 can wait until all the gradients from the learners 206 are received, aggregate the gradients, and update the weight, W. Additionally, the centralized parameter servers 204 can identify stragglers in the learners 206, and modify a processing aspect of the learners 206. Modifying the processing aspect can involve adjusting the sizes of the training data batches 208 for all the learners, e.g., reducing the number of training data records for the straggler, and distributing the reduction to the remaining learners 206. In some embodiments, modifying the processing aspect can involve modifying the frequency rate of the processors of the learners 206. For example, the frequency rate of the straggler's processor can be increased. Conversely, the frequency rate of the remaining learners 206 can be decreased.

In some embodiments, the centralized parameter servers 204 can modify the processing aspect of the learners using sense and actuate components (not shown). The sense component can identify the straggler(s). Additionally, the actuate component can dynamically act on output from the sense component by balancing the training time of the learners 206 as described above.

Figure 3:
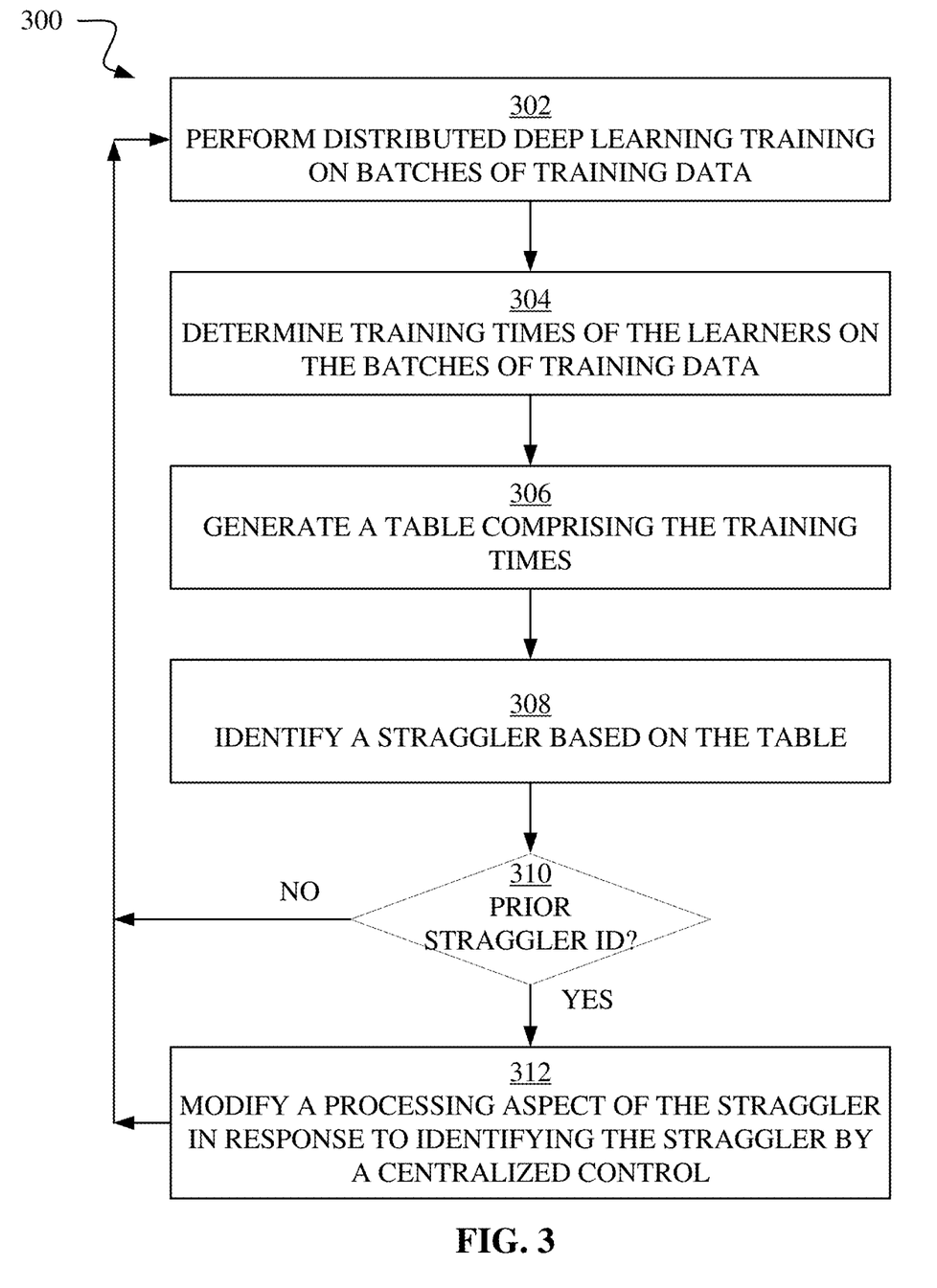
FIG. 3 is a process flow diagram of a method for determining dynamic computation rates for distributed deep learning, in accordance with some embodiments of the present disclosure.

FIG. 3 is a process flow diagram of a method 300 for determining dynamic computation rates for distributed deep learning, in accordance with some embodiments of the present disclosure. In some embodiments of the present disclosure, the learners 106 and the distributed deep learning training central parameter server 104, described with respect to FIG. 1, may perform the method 300.

At operation 302, the learners 106 can perform distributed deep learning training on batches of training data, such as, the training data 108. Performing distributed deep learning training can involve performing classifications on each of the records on batches of training data 108. Additionally, distributed deep learning training can involve adjusting weights and gradients based on the correctness of the classifications.

At operation 304, the learners 106 can determine the training times of the learners 106 on the batches of training data 108. Determining the training times can involve identifying start and stop times between which each of the learners performs the processing for its batch of training data 108.

At operation 306, the distributed deep learning training central parameter server 104 can generate a table comprising the training times of the learners 106. Generating the table can additionally involve sorting the table based on training time, where the learners 106 with greater training times occupy the bottom or top entries of the table.

At operation 308, the distributed deep learning training central parameter server 104 can identify a straggler based on the table. The straggler can be a learner with the longest training time that exceeds a predetermined threshold team. Alternatively, the straggler(s) can have a training time outside a threshold time. In some embodiments, the threshold time can be based on the standard deviation of the training times of all the learners.

At operation 310, the distributed deep learning central parameter server 104 can determine if the identified straggler has been previously identified as a straggler. More specifically, the learner manager 110 can perform this determination. In this way, the learner manager 110 can limit identified stragglers to those that exceed the predetermined threshold multiple times. Thus, if the identified straggler has no prior straggler identification, control may flow back to operation 302 for further training. However, if the identified straggler has a prior straggler identification, control may flow to operation 312.

At operation 312, the learner manager 110 can modify a processing aspect of the straggler in response to identifying the straggler by a centralized control, e.g., the distributed deep learning training central parameter server 104. Modifying the processing aspect can include reducing the amount of training data 108 for the straggler, increasing the frequency rate of a computational processor of the straggler, and/or reducing the frequency rate of the remaining learners. In some embodiments, the batch size of the reduced training data can be linearly proportional to the batch execution time, i.e., the training time of the straggler. Additionally, adjusting the batch size for stragglers can balance out their future batch execution times compared to the rest of the learners 106.

In some embodiments, the method 300 can include a control loop to balance learners 106 by detecting future imbalance cases and acting as described above. Additionally, in some embodiments, the method 300 can include a feedback loop to determine if there is a ping-pong effect on the same learner 106. The ping-pong effect can refer to a scenario where the same learner is repeatedly identified as a straggler and sped up, then not identified as a straggler and slowed down, repeatedly. In such a case, the feedback loop may stop the repeat identifications by keeping the ping-ponging learner in one category or the other, e.g., a straggler or non-straggler.

Figure 4:
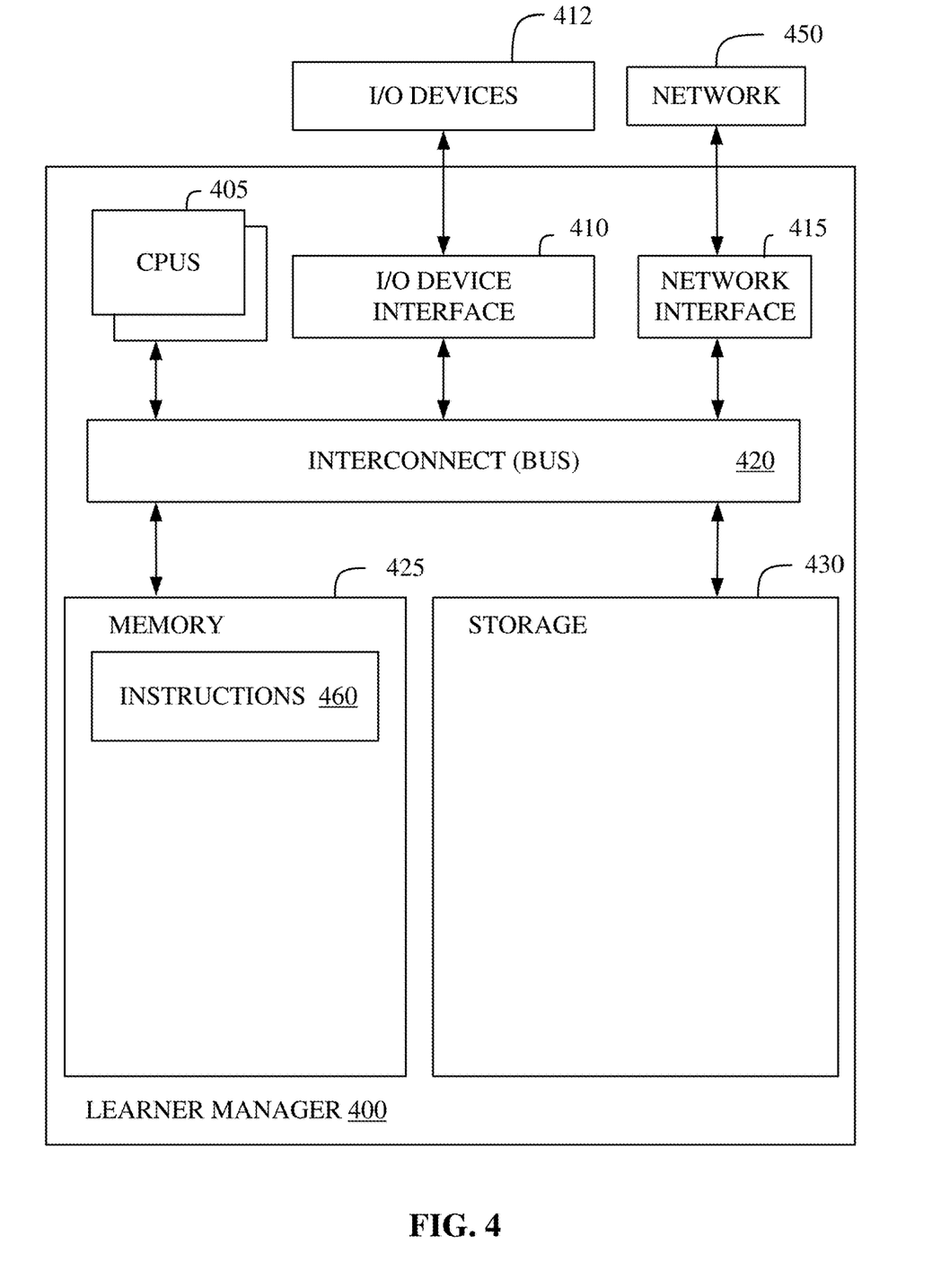
FIG. 4 is a block diagram of an example learner manager, in accordance with some embodiments of the present disclosure.

FIG. 4 is a block diagram of an example learner manager 400, in accordance with some embodiments of the present disclosure. In various embodiments, the learner manager 400 is similar to the learner manager 110 and can perform the method described in FIG. 3, and/or the functionality discussed in FIGS. 1 and 2. In some embodiments, the learner manager 400 provides instructions for the aforementioned methods and/or functionalities to a client machine such that the client machine executes the method, or a portion of the method, based on the instructions provided by the learner manager 400. In some embodiments, the learner manager 400 comprises software executing on hardware incorporated into a plurality of devices.

The learner manager 400 includes a memory 425, storage 430, an interconnect (e.g., BUS) 420, one or more CPUs 405 (also referred to as processors 405 herein), an I/O device interface 410, I/O devices 412, and a network interface 415.

Each CPU 405 retrieves and executes programming instructions stored in the memory 425 or the storage 430. The interconnect 420 is used to move data, such as programming instructions, between the CPUs 405, I/O device interface 410, storage 430, network interface 415, and memory 425. The interconnect 420 can be implemented using one or more busses. The CPUs 405 can be a single CPU, multiple CPUs, or a single CPU having multiple processing cores in various embodiments. In some embodiments, a CPU 405 can be a digital signal processor (DSP). In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of random access memory (e.g., static random access memory (SRAM), dynamic random access memory (DRAM), or Flash). The storage 430 is generally included to be representative of non-volatile memory, such as a hard disk drive, solid-state device (SSD), removable memory cards, optical storage, and/or flash memory devices. Additionally, the storage 430 can include storage area network (SAN) devices, the cloud, or other devices connected to the learner manager 400 via the I/O device interface 410 or to a network 450 via the network interface 415.

In some embodiments, the memory 425 stores instructions 460. However, in various embodiments, the instructions 460 are stored partially in memory 425 and partially in storage 430, or they are stored entirely in memory 425 or entirely in storage 430, or they are accessed over a network 450 via the network interface 415.

Instructions 460 can be processor-executable instructions for performing any portion of, or all, of the method described in FIG. 3, and/or the functionality discussed in FIGS. 1 and 2.

In various embodiments, the I/O devices 412 include an interface capable of presenting information and receiving input. For example, I/O devices 412 can present information to a listener interacting with learner manager 400 and receive input from the listener.

The learner manager 400 is connected to the network 450 via the network interface 415. Network 450 can comprise a physical, wireless, cellular, or different network.

In some embodiments, the learner manager 400 can be a multi-user mainframe computer system, a single-user system, or a server computer or similar device that has little or no direct user interface but receives requests from other computer systems (clients). Further, in some embodiments, the learner manager 400 can be implemented as a desktop computer, portable computer, laptop or notebook computer, tablet computer, pocket computer, telephone, smartphone, network switches or routers, or any other appropriate type of electronic device.

It is noted that FIG. 4 is intended to depict the major representative components of an exemplary learner manager 400. In some embodiments, however, individual components can have greater or lesser complexity than as represented in FIG. 4, components other than or in addition to those shown in FIG. 4 can be present, and the number, type, and configuration of such components can vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
   determining a plurality of training times wherein a corresponding plurality of learners performs the distributed deep learning training on a corresponding plurality of batches of training data; and
   balancing a straggler training time and a remaining learners training time for performing the distributed deep learning training on a new plurality of batches of training data by:

identifying a ping-pong straggler by determining that the ping-pong straggler changes from a straggler learner to a non-straggler learner in a first deep learning training, and changes from the non-straggler learner to the straggler learner in a second deep learning training;
maintaining the ping-pong straggler as the straggler learner based on identifying the ping-pong straggler;
modifying a frequency rate of a computational circuit of at least one of the corresponding plurality of learners in response to identifying a subsequent straggler during a subsequent distributed deep learning training using:
the corresponding plurality of learners; and
a centralized control; and
performing distributed deep learning training on the new plurality of batches of training data using the corresponding plurality of learners and the modified frequency rate.

2. The method of claim 1, further comprising:
generating a table comprising the training times; and
identifying the straggler based on the table, wherein a training time of the straggler exceeds a threshold training time for the plurality of training times.

3. The method of claim 1, further comprising:
determining a size of the new batch of training data; and
distributing an excess amount of straggler training data to a plurality of remaining learners for performing the distributed deep learning training.

4. The method of claim 3, further comprising:
performing the distributed deep learning training on the new batch of training data by the straggler; and
performing the distributed deep learning training on the excess amount of straggler training data by the plurality of remaining learners.

5. The method of claim 1, wherein modifying a frequency rate of a computational circuit of at least one of the corresponding plurality of learners comprises increasing a frequency rate of a computational circuit of the straggler.

6. The method of claim 1, further comprising modifying a processing aspect of a plurality of remaining learners.

7. The method of claim 6, wherein modifying a frequency rate of a computational circuit of at least one of the corresponding plurality of learners comprises decreasing a frequency rate of a computational circuit of one or more of the plurality of remaining learners.

8. A computer program product comprising program instructions stored on a computer readable storage medium, the program instructions executable by a processor to cause the processor to perform a method comprising:
determining a plurality of training times wherein the plurality of learners performs the distributed deep learning training on the plurality of batches of training data; and
balancing a straggler training time and a remaining learners training time for performing the distributed deep learning training on a new plurality of batches of training data by:
identifying a ping-pong straggler by determining that the ping-pong straggler changes from a non-straggler learner to a straggler learner in a first deep learning training, and changes from the straggler learner to the non-straggler learner in a second deep learning training;
maintaining the ping-pong straggler as the non-straggler learner based on identifying the ping-pong straggler;
modifying a frequency rate of a computational circuit of at least one of the corresponding plurality of learners in response to identifying a subsequent straggler during a subsequent distributed deep learning training using:
the corresponding plurality of learners; and
a centralized control; and
performing distributed deep learning training on the new plurality of batches of training data using the corresponding plurality of learners and the modified frequency rate.

9. The computer program product of claim 8, the method further comprising:
generating a table comprising the training times; and
identifying the straggler of the plurality of learners based on the table, wherein a training time of the straggler exceeds a threshold training time for the plurality of training times.

10. The computer program product of claim 8, wherein modifying the frequency rate of a computational circuit of at least one of the corresponding plurality of learners comprises decreasing a frequency rate of a computational circuit of one or more of the plurality of remaining learners.

11. The computer program product of claim 8, the method further comprising modifying a processing aspect of the straggler.

12. The computer program product of claim 11, further comprising:
determining a size of the new batch of training data; and
distributing an excess amount of straggler training data to the plurality of remaining learners for performing the distributed deep learning training.

13. The computer program product of claim 12, the method further comprising:
performing the distributed deep learning training on the new batch of training data by the straggler; and
performing the distributed deep learning training on the excess amount of straggler training data by the plurality of remaining learners.

14. The computer program product of claim 8, wherein modifying the frequency rate of a computational circuit of at least one of the corresponding plurality of learners comprises increasing a frequency rate of a computational circuit of the straggler.

15. A system comprising:
a computer processing circuit; and
a computer-readable storage medium storing instructions, which, when executed by the computer processing circuit, are configured to cause the computer processing circuit to perform a method comprising:
determining a plurality of training times wherein the plurality of learners performs the distributed deep learning training on the plurality of batches of training data; and
balancing a straggler training time and a remaining learners training time for performing the distributed deep learning training on a new plurality of batches of training data by:
identifying a ping-pong straggler by determining that the ping-pong straggler changes from a straggler learner to a non-straggler learner in a first deep learning training, and changes from the non-straggler learner to the straggler learner in a second deep learning training;
maintaining the ping-pong straggler as the straggler learner based on identifying the ping-pong straggler;
modifying a frequency rate of a computational circuit of at least one of the corresponding plurality of learners in response to identifying a subsequent straggler during a subsequent distributed deep learning training using:

the corresponding plurality of learners; and
a centralized control; and
performing distributed deep learning training on the new plurality of batches of training data using the corresponding plurality of learners and the modified frequency rate.

16. The system of claim 15, wherein further comprising: determining a size of the new batch of training data; and distributing an excess amount of straggler training data to a plurality of remaining learners for performing the distributed deep learning training.

17. The system of claim 16, the method further comprising:
performing the distributed deep learning training on the new batch of training data by the straggler; and
performing the distributed deep learning training on the excess amount of straggler training data by the plurality of remaining learners.

18. The system of claim 15, wherein modifying the frequency rate of a computational circuit of at least one of the corresponding plurality of learners comprises increasing a frequency rate of a computational circuit of the straggler.

19. The system of claim 15, wherein modifying the frequency rate of a computational circuit of at least one of the corresponding plurality of learners comprises decreasing a frequency rate of a computational circuit of one or more of the plurality of remaining learners.

\* \* \* \* \*